H. D. HIBBARD.
METALLURGICAL FURNACE.
APPLICATION FILED DEC. 31, 1912.
1,089,377.
Patented Mar. 3, 1914.
3 SHEETS—SHEET 2.
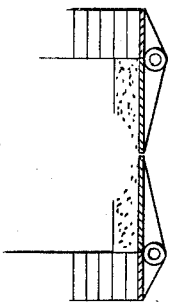
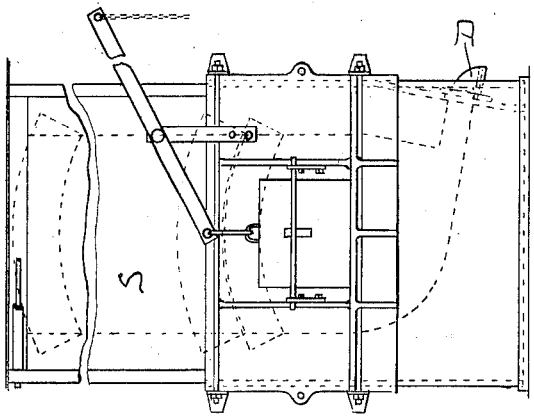
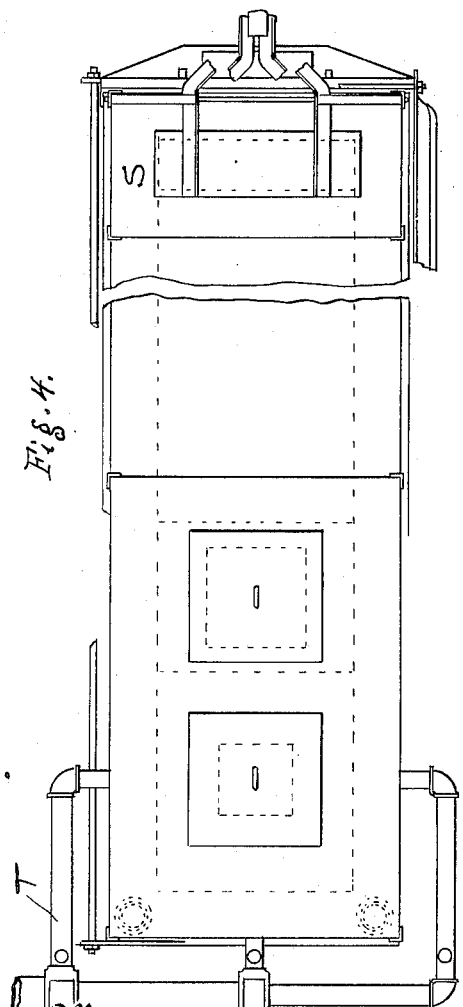
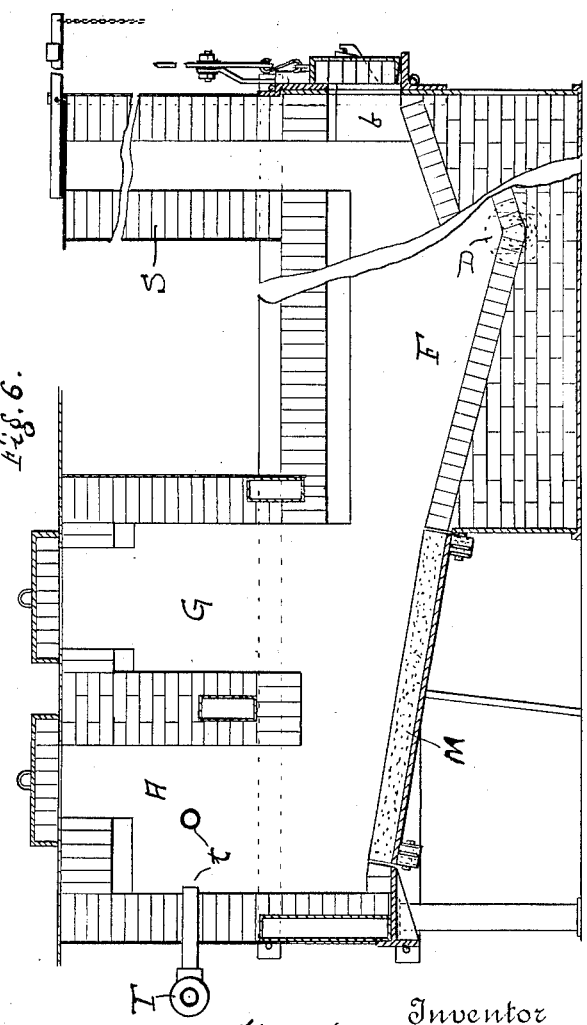
Witnesses:
Inventor
Henry D. Hibbard
By his Attorneys

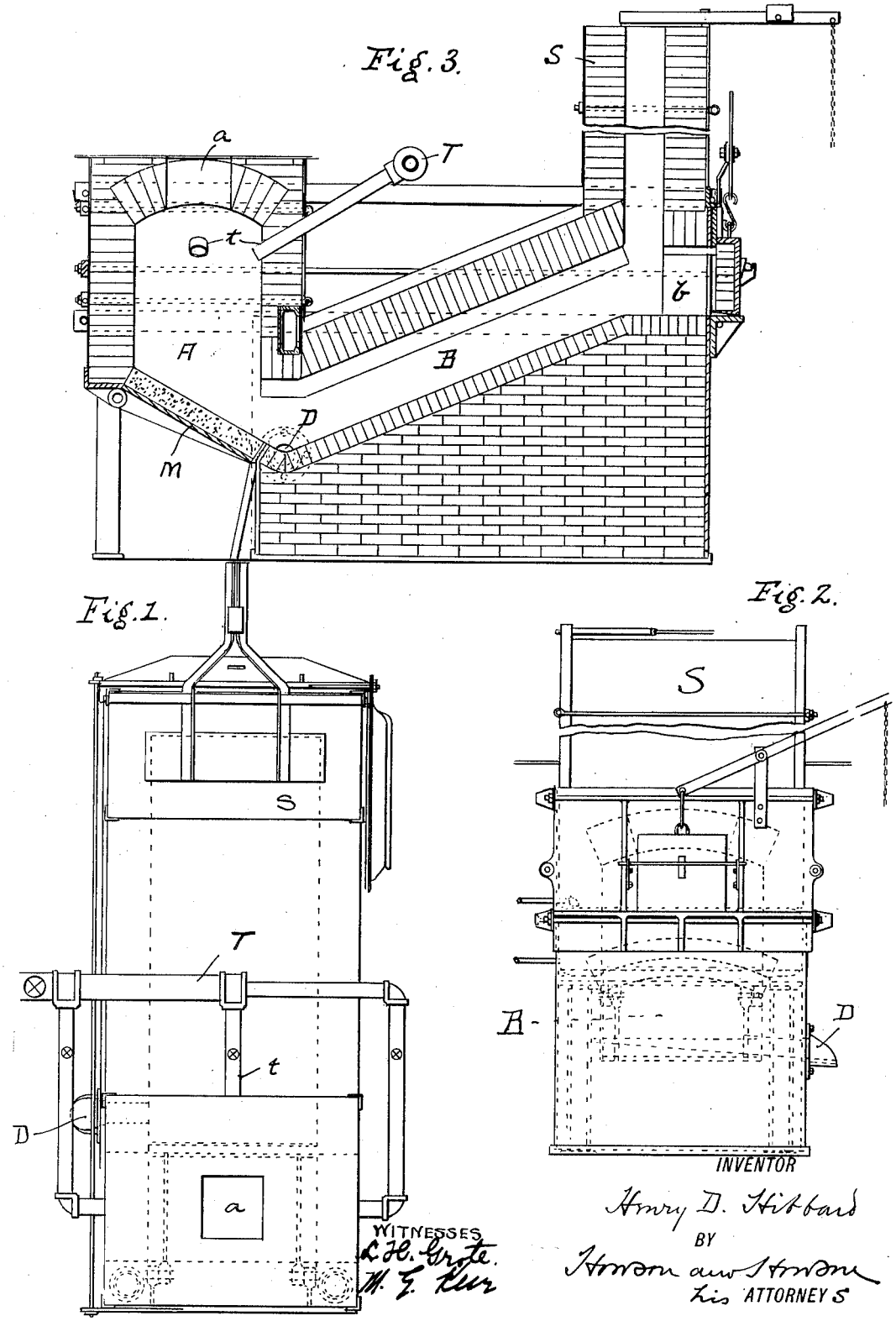

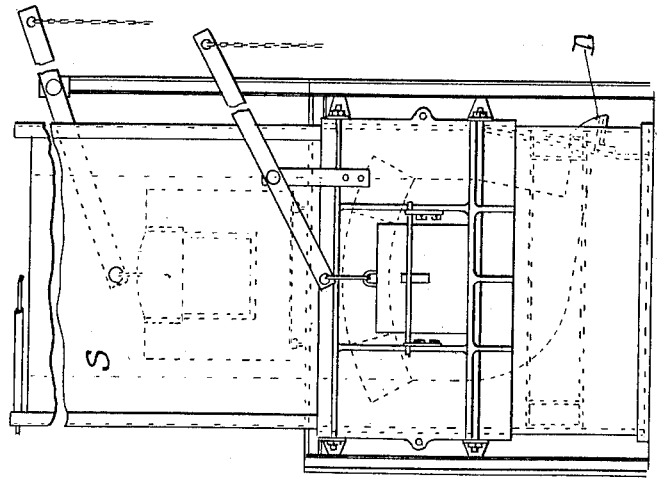
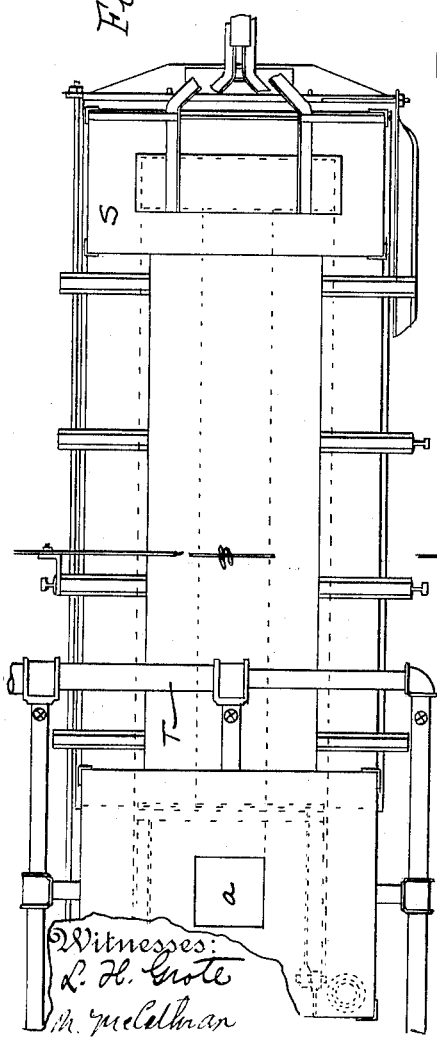
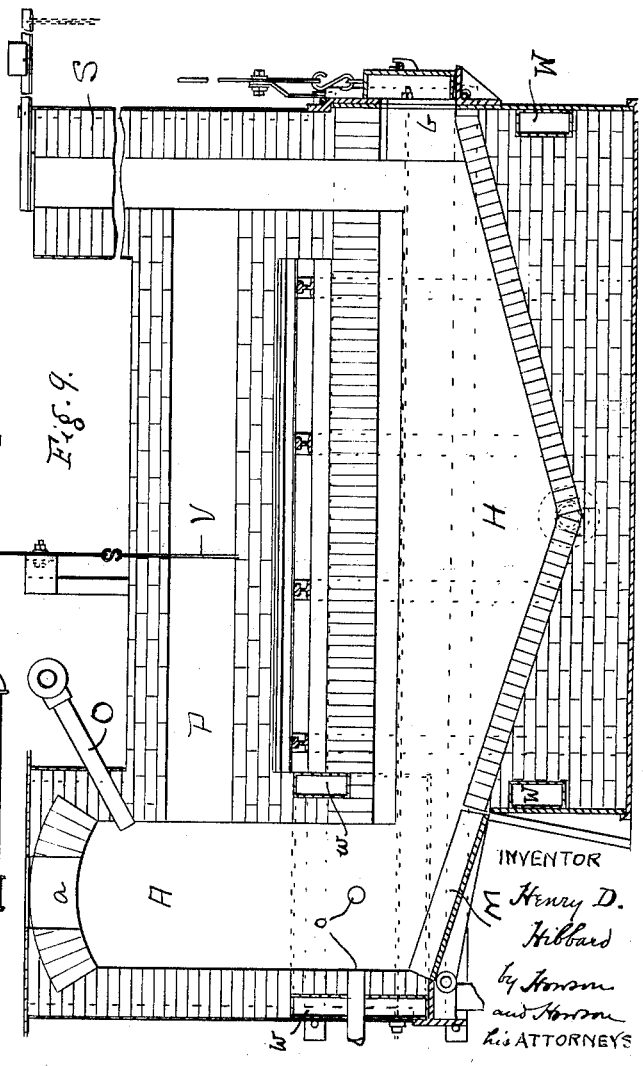

UNITED STATES PATENT OFFICE.

HENRY D. HIBBARD, OF PLAINFIELD, NEW JERSEY.

METALLURGICAL FURNACE.

1,089,377. Specification of Letters Patent. Patented Mar. 3, 1914.

Application filed December 31, 1912. Serial No. 739,505.

*To all whom it may concern:*

Be it known that I, HENRY D. HIBBARD, a citizen of the United States of America, and residing at Plainfield, in the county of Union and State of New Jersey, have invented a certain new and Improved Metallurgical Furnace, of which the following is a specification.

My invention relates to a furnace for melting metals and particularly to a down draft or down blast solid fuel furnace for melting iron, and iron ores.

The object of my invention is to provide a furnace in which metalliferous material may be melted without chemical change or with as little chemical change as possible. Thus it is frequently desired to melt oxidizable metalliferous material, such as ferro-manganese, without oxidation. Again, it is frequently desired to melt without oxidation or carburization a metalliferous substance such as manganese steel which is readily oxidized or carburized. Thirdly, it is sometimes desired to melt material which is rich in reducible metallic oxid, such as oxid of iron, without reducing the metal. To attain these and like results I have embodied my invention in the furnace shown in the accompanying drawings in which, Figures 1, 2 and 3 are broken plan, end elevation and longitudinal section respectively, of my improved furnace, in which a melt may be accomplished without oxidation of the charge; Figs. 4, 5 and 6 are like views of the furnace adapted to effect a melt when carburization and oxidation of the charge are both guarded against; Figs. 7, 8 and 9 are like views of the furnace adapted to effect a melt of a metallic oxid without reduction of the metal; and Fig. 10 is a cross section of the grate of the furnace shown in Fig. 6.

As above pointed out the melting of the metalliferous material without chemical change, is concerned, so far as the making of iron-products is concerned, principally with the three problems, viz. (1) melting without oxidation, (2) melting without oxidation or carburization, (3) melting without reduction of metallic oxids. Taking up these phases of the problem in the order named, the manner in which they are met in the present furnace will be briefly explained:

(1) *Melting without oxidation.*—Material such as manganese alloys cannot be melted in a furnace using a blast without oxidation of the manganese and this valuable constituent must be later replaced if manganese steel is to be manufactured from the charge. To obviate this loss, I now provide a furnace in which the melt is accomplished by gases from which practically all the oxygen has been exhausted before they reach the metal. To effect this the air of combustion is forced through a bed or layer of solid fuel of sufficient depth to burn substantially all the oxygen before the gases pass into the melting chamber in which the charge of ferro-manganese is situated. Thus as shown in Figs. 1 to 3, my new furnace is provided with a fuel chamber A into which coke or other suitable solid fuel is charged at intervals as needed through the top port $a$ and to which the air of combustion is supplied through downwardly directed twyers $t$ from the air box T. The air entering the combustion chamber through these twyers passes down through the incandescent fuel which exhausts substantially all the oxygen. The products of combustion escape from the fire chamber to the upwardly inclined melting chamber B which opens at its lower end into the lower portion of the fire chamber. The material to be melted is charged into this inclined melting chamber B through the normally closed port $b$ at the upper end thereof. The material to be melted is thus fed by gravity (or, in small furnaces, by manually operated tools) down the incline of the chamber B through which the gases from the fire chamber pass upward to the stack S. As the charge passes down the incline of the chamber B, it is first heated and as it reaches the lower portion of the chamber, it melts and runs out the spout D or is stored in the lower portion of the chamber if the spout is temporarily dammed. The incline of the bottom at this point toward the spout D, facilitates the discharge of the melted material. For melting ferro-manganese the furnace has preferably an acid or clay bottom and lining. It is obvious that by separating the fire chamber from the melting chamber and leading to the latter only the products of combustion from which practically all the oxygen has been exhausted, I obtain a melt of the metalliferous material without oxidation of the metal, a valuable feature in melting ferromanganese.

*(2) Melting without carburization (and oxidation.)*—Some metalliferous materials such as manganese steel scrap, combine readily with carbon when melted or at red heat. When such combination is undesirable, obviously the melt cannot be conducted in a furnace in which the fuel coke is intimately mixed in incandescent state with the charge of metal. To meet this condition I modify the furnace above described, by providing a chamber G adjacent the fire chamber A and between the latter and a gathering or storage chamber F for the melted metal, and the stack S. Here the gases of combustion driven by the down draft from the twyers $t$ and the suction of the stack S, pass through the material (such as manganese steel scrap) at the bottom of the chamber G, over the melted material in the chamber F and out through the stack. The metal, melting at the bottom of the chamber G, flows at once down the inclined bottom to the chamber F where it is stored out of contact with the carbonaceous material of the fire chamber A until tapped off through the spout D. Being thus removed from the fuel, the melted metal is maintained free from carbon, while if a proper depth of fuel bed is kept, the gases of combustion which effect the melt will also be substantially free from oxygen, and the melted metal will be unoxidized.

*(3) Melting without reduction.*—Here the essential is that the melted material, such as iron oxid, shall not be permitted to remain in contact with the carbon which has a reducing action in this case and would bring the oxid to metallic form. This result can be accomplished in the form of furnace shown in Figs. 7, 8 and 9 which is somewhat simpler than that just described. Here the fuel and metalliferous material may be charged together into the fire chamber A, between which and the stack S lies the storage chamber H. The bottom of the fire chamber slants down to the inclined side of the latter so that the material as melted flows away from the fire chamber and is stored in the storage chamber H, out of contact with the fuel and maintain in molten condition by the passage of the gases of combustion thereover. The bottom of this chamber, like that of the other construction above described, inclines downward to the discharge port D which opens from one side thereof.

To prevent injury to the lining of the collecting chamber which would otherwise be rapidly injured by the oxidizing action of the molten material, I provide a water jacket W placed as close as possible to the lining and at a point as near as possible to the upper level of the molten charge, which is of course the hottest point in the collecting chamber. By keeping this temperature as low as possible, the oxidizing action upon the lining is minimized. Of course the particular jacketing shown is merely exemplary and may be variously modified in its arrangement to attain the desired end. For the same reason a water jacket $w$ is arranged beneath the lining of the melting chamber in the region of greatest heat and the lining thereof thus protected at this melting zone.

To facilitate the initial heating of the charge, a by-pass outlet P is provided leading from the upper portion of the melting chamber and controlled by the valve V. Obviously when this valve is lifted the products of combustion find their way to the stack through this unobstructed passage rather than through the charge and collecting chamber; whereas when the by-pass outlet is closed the blast forces the products of combustion down through the charge and collecting chamber to the stack, as in furnaces previously described. During the melt, the upper blast twyers O are preferably cut off and only the lower twyers $o$ which open substantially at the melting zone, opened.

In the several forms of the furnace the fuel chamber is preferably provided with a drop bottom M which facilitates cleaning and repair. The bottom plates may extend all the way across the bottom, or be divided and swung from opposite sides of the furnace, as illustrated in Fig. 10. In the two forms of furnace shown in Figs. 4 to 9, the port $b$ at the end of the collecting chamber serves merely as a clean out and repair opening.

In utilizing the several forms described, the molten materials must, immediately after fusion, be dealt with properly. In each of the first two described furnaces, both metal and slag will be produced, but in the third only a non-metallic slag-like substance is formed. In each case the ash of the fuel is melted and joins the slag. In the furnace of the first type, if the metal melted be ferro-manganese, or other metallic alloy, saturated with carbon or some metal which does not combine with carbon, no harm will result if it remains in contact with the carbon. In the second and third types however, the molten material which drips from and runs down the melting pieces of the charge must be made to run away from the fuel into the secondary chamber which must be kept hot by the outgoing gases or else led to another furnace for further treatment. The slag formed, if any, will go with the metal.

The control over oxidation, carburization and reduction, which is obtained in the present furnace is the novel element of my invention, and I do not limit myself to the details of construction shown.

I claim as my invention:—

1. A metallurgical furnace of the character described, comprising a fire chamber with downwardly-inclined imperforate bottom for solid carbonaceous fuel, means for creating a down draft through the fuel therein, a furnace outlet for the gaseous products of combustion and an interposed portion through which said gases pass, said portion communicating with the fire chamber to receive the gaseous products of combustion therefrom and having a bottom merging without substantial break into the bottom of said fire chamber, means for collecting in and discharging from said interposed chamber a melted charge of metalliferous material, substantially as described.

2. A metallurgical furnace of the character described, comprising a fire chamber with downwardly-inclined imperforate bottom for solid carbonaceous fuel, means for creating a down draft through the fuel therein, a furnace outlet for the gases of combustion and an interposed portion through which said gases pass, said portion communicating with the fire chamber to receive the gases of combustion therefrom and an outlet from said interposed chamber for discharging melted material collected therein, said furnace having an inclined bottom substantially continuous with the bottom of the fire chamber for leading melted material to said interposed portion.

3. A metallurgical furnace of the character described, comprising a fire chamber with downwardly-inclined inperforate bottom for solid carbonaceous fuel, means for creating a down draft through the fuel therein, a furnace outlet for the gases of combustion and an interposed portion through which said gases pass, said portion communicating with the fire chamber to receive the gases of combustion therefrom and an outlet from said interposed chamber for discharging melted material collected therein, said furnace having an inclined bottom substantially continuous with the bottom of the fire chamber for leading melted material to said interposed portion, and the bottom of the latter being inclined toward its discharge outlet.

4. A metallurgical furnace of the character described, comprising a melting chamber for the reception of a combined ore and fuel charge, a stack and an interposed collecting chamber, a down draft blast for forcing air down through the charge and through the collecting chamber to the stack, together with a by-pass flue connecting the upper portion of the melting chamber directly with the stack for the purpose described.

5. A metallurgical furnace of the character described, comprising a melting chamber for the reception of a combined ore and fuel charge, a stack and an interposed collecting chamber, a down draft blast for forcing air down through the charge and through the collecting chamber to the stack, together with a by-pass flue connecting the upper portion of the melting chamber directly with the stack, said blast mechanism comprising twyers opening into the upper portion of the melting chamber for use in starting the combustion and supplemental twyers opening to the melting zone for use during the melt and valves for controlling the several twyers independently.

In testimony whereof I have signed my name to this specification, in the presence of two subscribing witnesses.

HENRY D. HIBBARD.

Witnesses:
 WALTER ABBE,
 L. H. GROTE.